United States Patent
Nam et al.

(10) Patent No.: US 11,525,290 B2
(45) Date of Patent: Dec. 13, 2022

(54) MOTOR-DRIVEN DOOR LATCH FOR VEHICLE

(71) Applicants: Hyundai Motor Company, Seoul (KR); Kia Motors Corporation, Seoul (KR)

(72) Inventors: Jinwoo Nam, Seoul (KR); Kyoung Taek Kwak, Yongin-si (KR); Jungho Han, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 822 days.

(21) Appl. No.: 16/441,928

(22) Filed: Jun. 14, 2019

(65) Prior Publication Data
US 2020/0284069 A1   Sep. 10, 2020

(30) Foreign Application Priority Data

Mar. 6, 2019  (KR) .................. 10-2019-0025607

(51) Int. Cl.
*E05B 81/90*   (2014.01)
*B60J 5/04*    (2006.01)
(Continued)

(52) U.S. Cl.
CPC ............. *E05B 81/90* (2013.01); *B60J 5/04* (2013.01); *E05B 77/12* (2013.01); *E05B 81/06* (2013.01);
(Continued)

(58) Field of Classification Search
CPC .......... E05B 81/00; E05B 81/02; E05B 81/04; E05B 81/06; E05B 81/12; E05B 81/14;
(Continued)

(56) References Cited

U.S. PATENT DOCUMENTS

2005/0145740 A1   7/2005  Rathmann et al.
2009/0241617 A1*  10/2009  Takahashi ............... E05B 77/26
                                                              292/216
(Continued)

FOREIGN PATENT DOCUMENTS

CN       105019742 A    11/2015
DE       10251382 A1    5/2004
(Continued)

OTHER PUBLICATIONS

Machine translation description of DE102014016787 (Year: 2016).*

*Primary Examiner* — Christine M Mills
*Assistant Examiner* — Christopher F Callahan
(74) *Attorney, Agent, or Firm* — Slater Matsil, LLP (57) ABSTRACT

A motor-driven door latch includes a catch part that is caught on a striker to lock the vehicle door to the vehicle body or is released from the striker so that the vehicle door can be opened from the vehicle body. A door locking and releasing part includes a main motor and is configured to apply a torque to the catch part through the main motor. An emergency door releasing part is provided with an auxiliary motor and is contacted with the door locking and releasing part by operation of the auxiliary motor. An inside emergency operating lever is connected with an inside handle installed at the vehicle door and is configured to receive an operation force of the inside handle to rotate and apply torque to the catch part through the emergency door releasing part and the door locking and releasing part.

18 Claims, 12 Drawing Sheets

(51) Int. Cl.
*E05B 81/16* (2014.01)
*E05B 81/06* (2014.01)
*E05B 85/06* (2014.01)
*E05B 81/76* (2014.01)
*E05B 77/12* (2014.01)
*E05B 81/36* (2014.01)
*E05B 81/34* (2014.01)

(52) U.S. Cl.
CPC .............. *E05B 81/16* (2013.01); *E05B 81/34* (2013.01); *E05B 81/36* (2013.01); *E05B 81/76* (2013.01); *E05B 85/06* (2013.01); *E05Y 2900/531* (2013.01)

(58) Field of Classification Search
CPC .......... E05B 81/16; E05B 81/24; E05B 81/26; E05B 81/30; E05B 81/32; E05B 81/34; E05B 81/36; E05B 81/64; E05B 81/76; E05B 81/90; E05B 77/02; E05B 85/06; E05B 77/12; Y10T 292/1047; Y10T 292/1082; Y10S 292/22; Y10S 292/23; Y10S 292/65

See application file for complete search history.

(56) References Cited

U.S. PATENT DOCUMENTS

| | | | |
|---|---|---|---|
| 2015/0308163 | A1 | 10/2015 | Tomaszewski |
| 2016/0325711 | A1* | 11/2016 | Ichinose ................. E05B 77/32 |
| 2017/0314298 | A1* | 11/2017 | Tomaszewski ......... E05B 77/30 |

FOREIGN PATENT DOCUMENTS

| | | | | |
|---|---|---|---|---|
| DE | 102013020423 | A1 | 6/2015 | |
| DE | 102014016787 | A1 | 5/2016 | |
| EP | 2826938 | A2 | 1/2015 | |
| WO | WO-2013170363 | A1 * | 11/2013 | ............. E05B 77/26 |
| WO | WO-2014082175 | A1 * | 6/2014 | ............. E05B 77/26 |
| WO | 2016074842 | A1 | 5/2016 | |

* cited by examiner

MOTOR-DRIVEN DOOR LATCH FOR VEHICLE

CROSS-REFERENCE TO RELATED APPLICATIONS

This application claims priority to Korean Patent Application No. 10-2019-0025607, filed in the Korean Intellectual Property Office on Mar. 6, 2019, which application is hereby incorporated herein by reference.

TECHNICAL FIELD

The present invention relates to a motor-driven door latch for a vehicle.

BACKGROUND

Generally, a motor-driven door latch for a vehicle is used to lock or unlock a door to a vehicle body by using a motor for the convenience of the user.

In addition, an inside handle and an outside handle are respectively installed to allow the user to grasp the vehicle door and to easily operate the vehicle door, and a switch or the like is provided on the vehicle door for locking or releasing the motor-driven door latch.

However, in the conventional motor-driven door latch structure, when the motor is inoperable due to a vehicle collision or battery discharge, a structure or a device for releasing the door locking state through an appropriate door unlocking means has been became necessary.

The above information disclosed in this Background section is only for enhancement of understanding of the background of the invention and therefore it may contain information that does not form the prior art that is already known in this country to a person of ordinary skill in the art.

SUMMARY

The present invention relates to a motor-driven door latch for a vehicle. Particular embodiments of the invention relate to a motor-driven door latch for a vehicle capable of turning a door into an unlocked state using an emergency motor when a motor for opening and closing a door is inoperable.

Embodiments of the invention can provide a motor-driven door latch for a vehicle capable of easily releasing the door locking state even if a motor for opening and closing a door cannot be operated due to a collision accident or battery discharge and easily releasing the door locking state even by a key operation for a vehicle, thereby improving the merchantability and safety of the vehicle.

A motor-driven door latch for a vehicle according to an exemplary embodiment of the present invention may include, a catch part which is caught on a striker mounted on the vehicle to lock a door for a vehicle to a vehicle body or is released from the striker so that the door can be opened from the vehicle body. A door locking and releasing part includes a main motor and applies torque to the catch part through the main motor to allow the catch part to be locked to or released from the striker. An emergency door releasing part is provided with an auxiliary motor and contacted with the door locking and releasing part by the operation of the auxiliary motor when the main motor is not operated. An inside emergency operating lever is connected with an inside handle installed at the door for the vehicle and receives an operation force of the inside handle to rotate and apply torque to the catch part through the emergency door releasing part and the door locking and releasing part. An outside emergency operating lever is connected with an outside handle installed at the door for the vehicle and receives an operation force of the outside handle to rotate and apply torque to the catch part through the emergency door releasing part and the door locking and releasing part.

The catch part may comprise a catch having a locking groove which the striker mounted on the vehicle body is catch in or separated from and being installed to be rotatable; and a pawl installed to be rotatable and in close contact with the catch to limit the rotation of the catch or separated from the catch to allow the catch to be freely rotatable.

The door locking and releasing part may comprise the main motor, which can rotates in a clockwise and anticlockwise directions and includes a first drive gear; a first driven gear engaged with the first drive gear; a pawl release lever coupled to the pawl to be integrally rotated; and an operating lever, which is engaged with the first driven gear and receives the torque through the first driven gear to rotate the pawl release lever.

The emergency door releasing part may comprise the auxiliary motor including a second drive gear; a second driven gear engaged with the second drive gear; a master locking link, which installed to be rotatable, contacted with the second driven gear so that the rotation thereof is limited and includes a hook at one end portion thereof; and a pressurizing spring applying an elastic force to the master locking link in order to rotate the master locking link in a direction.

Two seating protrusions may be formed at the pawl release lever; and a pressurizing protrusion which seats on the seating protrusions, and presses and rotates the pawl release lever, may be provided at the operating lever.

A door latch controller detecting an operation of a handle or a button installed at the door for the vehicle and applying an operation signal to the main motor, may be further included.

The door latch controller may detect vehicle collision through a collision detecting sensor to apply an operation signal to the auxiliary motor when the main motor is inoperable due to vehicle collision.

The inside emergency operating lever may be installed to be rotatable and one end portion thereof is provided with a pressurizing flange; and the master locking link may be provided with a rotation inducing flange, which corresponds to the pressurizing flange and is pressed by the pressurizing flange down to rotate the master locking link.

The outside emergency operating lever may be installed to be rotatable, one end portion thereof may be formed with a wire hole with which a wire is connected and the other end portion thereof is formed with a first long hole; and the master locking link may be provided with a pin shaft inserted into the first long hole.

A key cylinder into which a key for a vehicle is inserted to operate may be provided with a key nut; the key nut may be connected with one end portion of a key lever; and the other end portion of the key lever may be connected with the second driven gear.

The key lever may be formed with a second long hole at a lower portion thereof; and the second driven gear may be provided with a coupling protrusion inserted into the second long hole.

A protrusion may be provided at an upper portion of the key lever; the key nut may be provided with two first and second operating protrusions spaced from each other in a circumference direction; and a movable groove into which the protrusion is inserted to move may be provided between the first and second operating protrusions.

In accordance with the motor-driven door latch for a vehicle according to an exemplary embodiment of the present invention, since a door for a vehicle can be locked a vehicle body in a stable manner by using a main motor and the locked door can be freely released from the vehicle body, the user can conveniently use a door for a vehicle.

When the main motor is inoperable due to a discharge or collision, it is possible to release the door locked to the vehicle body via an auxiliary motor and an inside handle or an outside handle, so that the use safety of the door for a vehicle can be improved.

When the main motor and the auxiliary motor are inoperable at the same time, a key for the vehicle can be used to release the door locked to the vehicle body, thereby further improving the use safety of the door for a vehicle.

BRIEF DESCRIPTION OF THE DRAWINGS

These drawings are for reference purposes only and are not to be construed as limiting the technical idea of the present invention to the accompanying drawings.

The following reference numerals can be used in conjunction with the drawings:
1: first base plate
2: second base plate
10: catch part
11: catch
12: pawl
20: door locking and releasing part
21: main motor
22: first driven gear
23: pawl release lever
24: operating lever
30: emergency door releasing part
31: auxiliary motor
32: second driven gear
33: master locking link
34: pressurizing spring
40: inside emergency operating lever
50: outside emergency operating lever
60: key nut
70: key lever

DETAILED DESCRIPTION OF ILLUSTRATIVE EMBODIMENTS

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Since size and thickness of each component illustrated in the drawings are arbitrarily represented for convenience in explanation, the present invention is not particularly limited to the illustrated size and thickness of each component and the thickness is enlarged and illustrated in order to clearly express various parts and areas.

In the following description, dividing names of components into first, second and the like is to divide the names because the names of the components are the same as each other and an order thereof is not particularly limited.

Throughout the specification, unless explicitly described to the contrary, the word "comprise" and variations such as "comprises" or "comprising", will be understood to imply the inclusion of stated elements but not the exclusion of any other elements.

Referring to FIGS. 1 to 5, a motor-driven door latch for a vehicle according to an exemplary embodiment of the present invention may include a catch part 10 which is caught on a striker mounted on the vehicle to lock a door for a vehicle to the vehicle body or is released from the striker so that the door can be opened from the vehicle body; a door locking and releasing part 20 which applies torque to the catch part 10 to allow the catch part 10 to be locked to or released from the striker; and an emergency door releasing part 30 that allows the door locked to the vehicle body to be released from the vehicle body when the door locking and releasing part 20 is not operated due to battery discharge or collision, and the like.

Figure 1:
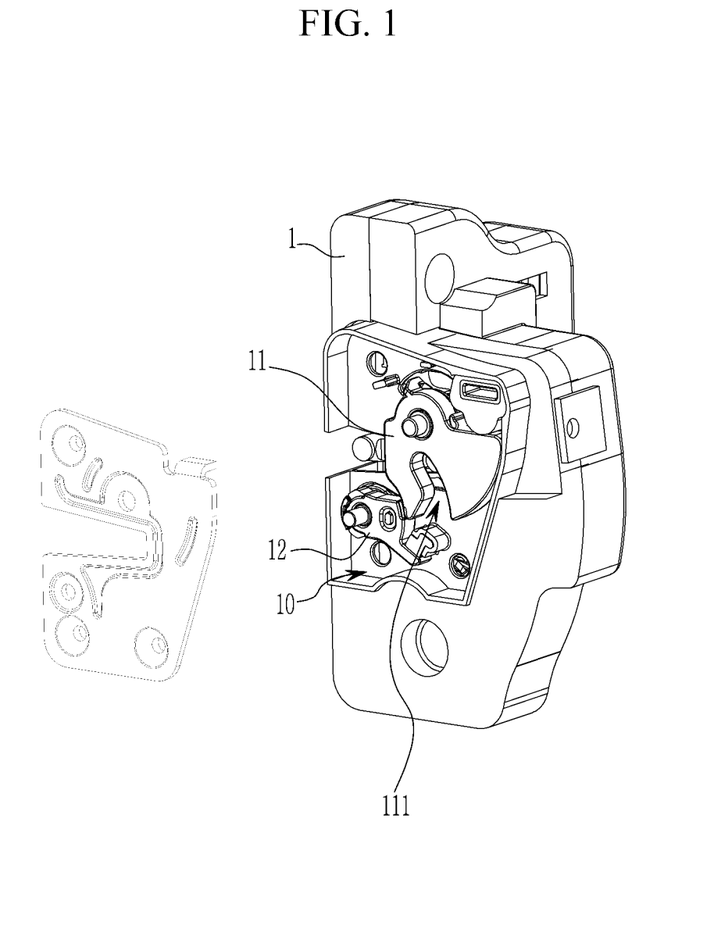
FIG. 1 is a side view of a motor-driven door latch for a vehicle according to an exemplary embodiment of the present invention.
Figure 2:
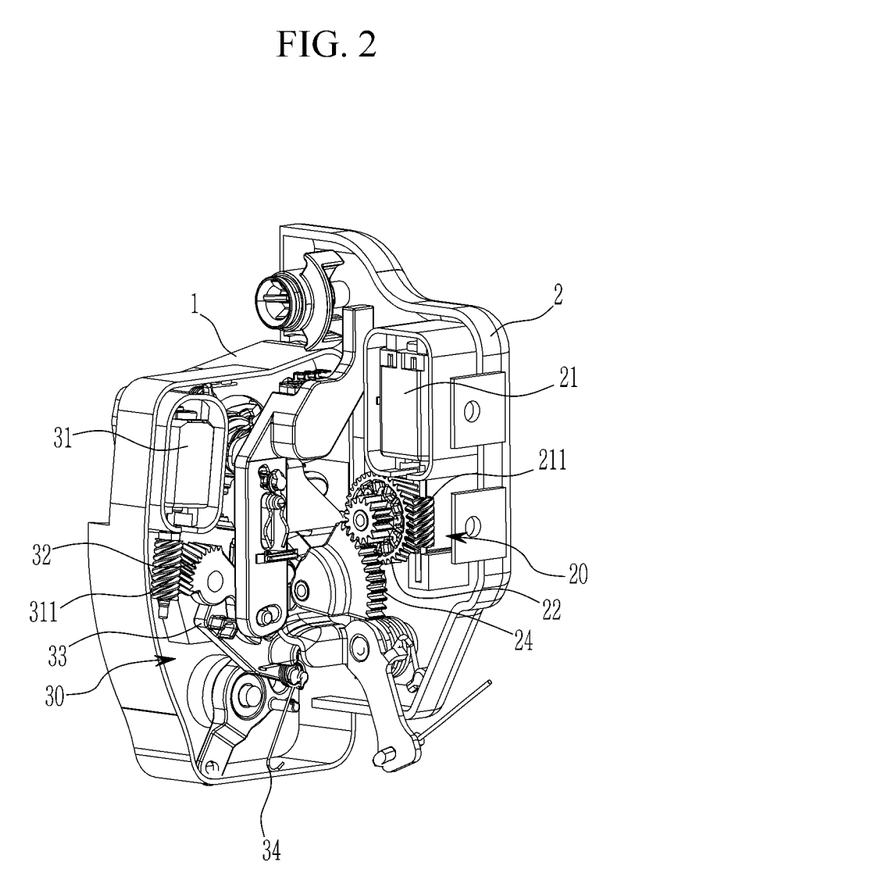
FIG. 2 is a front view of the motor-driven door latch for the vehicle according to an exemplary embodiment of the present invention.
Figure 3:
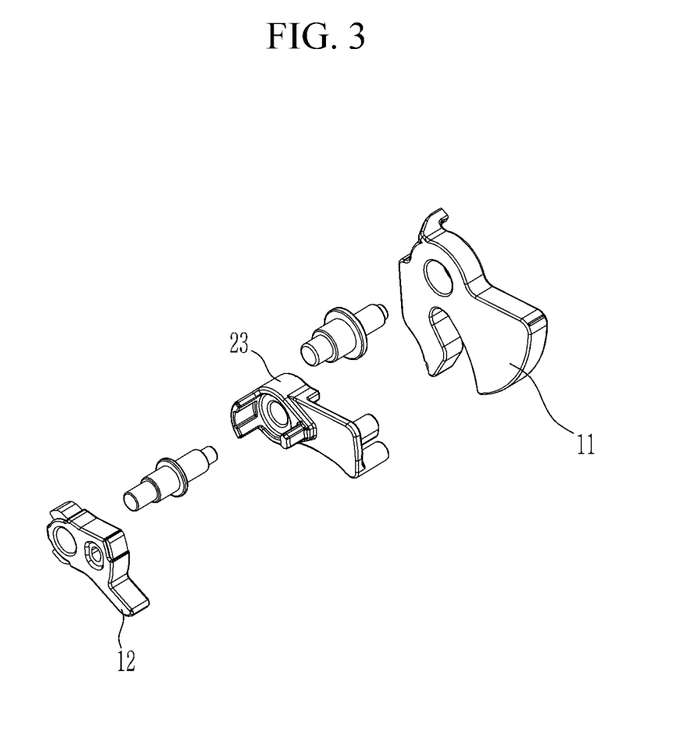
FIG. 3 is an exploded perspective view of a catch part of the motor-driven door latch for the vehicle according to an exemplary embodiment of the present invention.
Figure 4:
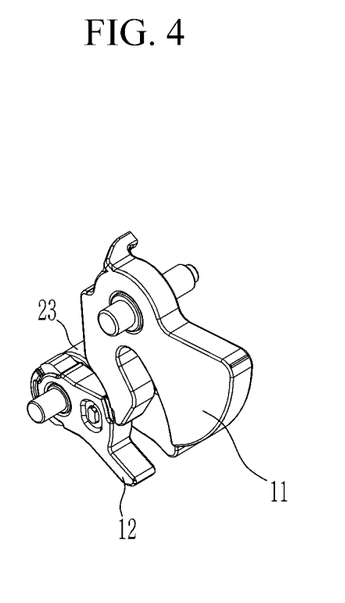
FIG. 4 is a perspective view showing coupling state of a pawl and a pawl release lever of the motor-driven door latch for the vehicle according to an exemplary embodiment of the present invention.

The catch part 10 may include a catch 11, which is rotatably mounted on one side of a first base plate 1 and has a locking groove in which the striker mounted on the vehicle body is inserted into or separated from and a pawl 12, which is mounted on the first base plate 1 to be rotatable and is in close contact with the catch 11 to limit the rotation of the catch 11 or separated from the catch 11 to allow the catch 11 to be freely rotatable.

Figure 5:
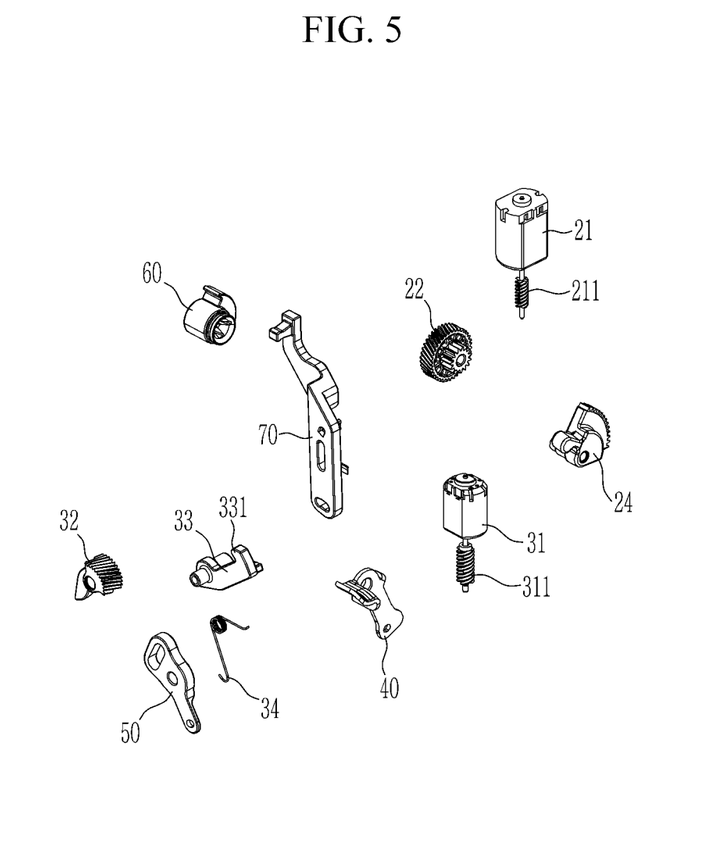
FIG. 5 is an exploded perspective view of a door locking and releasing part and an emergency door releasing part of the motor-driven door latch for the vehicle according to an exemplary embodiment of the present invention.

The door locking and releasing part 20 may include a main motor 21, which is mounted on a second base plate 2, rotatable in a clockwise and anticlockwise directions, and includes a first drive gear 211. A first driven gear 22 is engaged with the first drive gear 211. A pawl release lever 23 is disposed with the first base plate 1 interposed therebetween and coupled to the pawl 12 to be integrally rotated (referring to FIG. 4). An operating lever 24 is engaged with the first driven gear 22 and rotates while receiving a torque from the first driven gear 22 to rotate the pawl release lever 23.

The emergency door releasing part 30 may include an auxiliary motor 31 for emergency mounted on the first base plate 1 and provided with a second drive gear 311; a second driven gear 32 engaged with the second drive gear 311; a master locking link 33 of which one end portion is rotatably mounted on the first base plate 1 and the other end portion is provided with a hook 331; and a pressurizing spring 34 for pressurizing the master locking link 33 to be rotated in a clockwise direction.

When the user operates a release handle or a button mounted on the door, a door latch controller detects this to apply an operation signal to the main motor 21 to operate the main motor 21.

Figure 6:
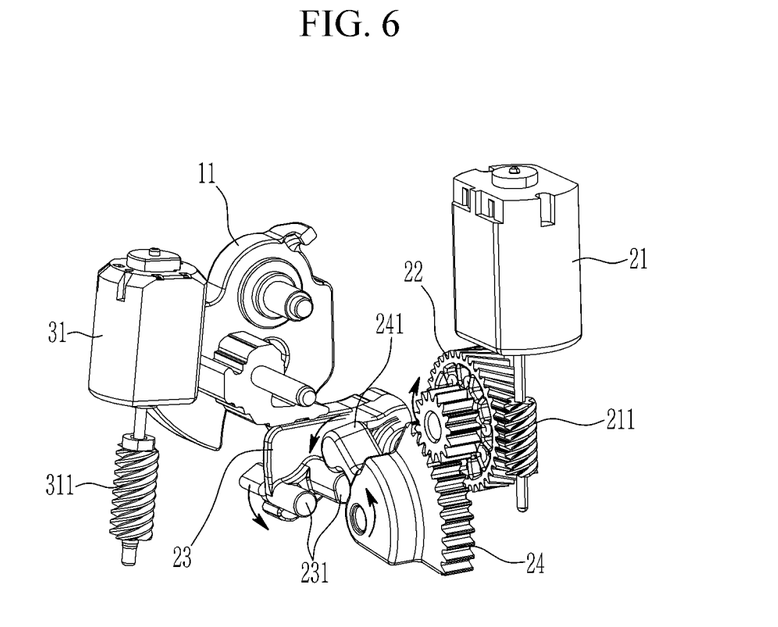
FIG. 6 is an operational explanatory diagram of the door locking and releasing part of the motor-driven door latch for the vehicle according to an exemplary embodiment of the present invention.

Referring to FIG. 6, the first drive gear 211 and the first driven gear 22 rotate respectively by driving the main motor 21, the operating lever 24 engaged with the first driven gear 22 is rotated to rotate the pawl release lever 23, and the pawl 12 rotates together by the rotation of the pawl release lever 23 and is spaced from the catch 11, so that the catch 11 can freely rotate, thereby releasing the door locked the vehicle body and opening the door.

Therefore, when the user pushes or pulls the door while holding the inside handle or the outside handle installed on the door, the door is opened while one side of the door is supported by the vehicle body and the door is being rotated.

The pawl release lever 23 may be provided with two seating protrusions 231 and the operating lever 24 may be provided with a pressurizing protrusion 241 which is seated on the seating protrusions 231 to press and rotate the pawl release lever 23.

On the other hand, if the main motor fails due to a vehicle collision, the door latch controller senses the collision through a collision detecting sensor and applies an actuating signal to the auxiliary motor 31.

Figure 7:
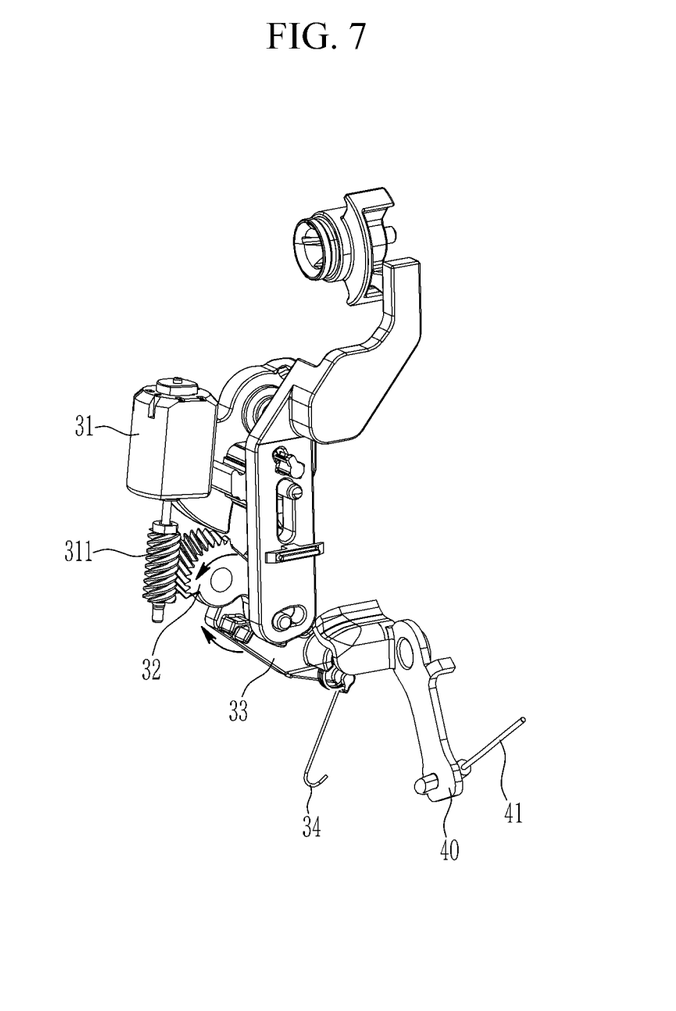
FIGS. 7 and 8 are operational explanatory diagrams of the emergency door releasing part of the motor-driven door latch for the vehicle according to an exemplary embodiment of the present invention.
Figure 8:
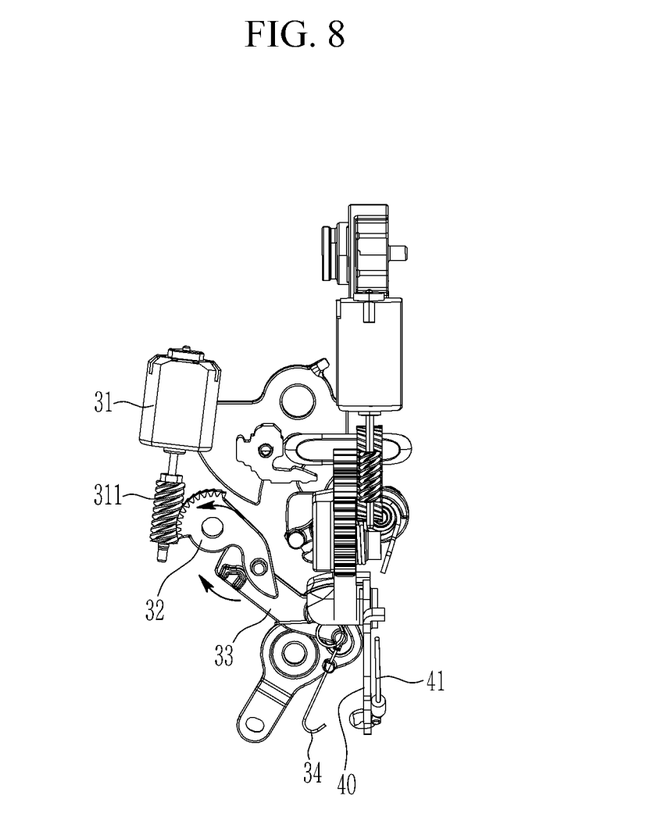

Thus, as shown FIGS. 7 and 8, the operation of the auxiliary motor 31 rotates the second drive gear 311 and the second driven gear 32 respectively, and the master locking link 33 is released from the second driven gear 32 by the rotation of second driven gear 32 and rotates in a clockwise by the elastic restoring force of the pressurizing spring 34, so that a door lock release preparation state where a hook 331 of the master locking link 33 is hung on the seating protrusions of the pawl release lever 23 is made.

Figure 9:
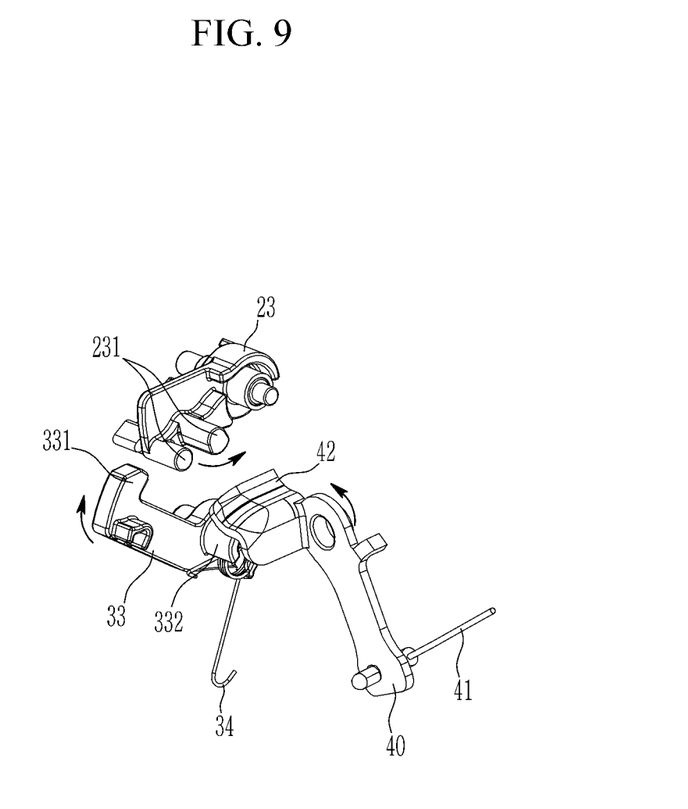
FIG. 9 is an operational explanatory diagram of an inside emergency operating lever and a master locking link of the motor-driven door latch for the vehicle according to an exemplary embodiment of the present invention.

In the door lock release preparation state, if a passenger pulls the inside handle, the inside emergency operating lever 40 connected with the inside handle through a wire 41 is rotated.

The inside emergency operating lever 30 may be installed on the second base plate 2 to be rotatable and one end portion thereof may be provided with a pressurizing flange 42, as shown in FIG. 9.

Further, in the master locking link 33, a rotation inducing flange 332 may be formed in a circular arc shape corresponding to the pressurizing flange 42. The pressurizing flange 42 is integrally rotated by the rotation of the inside emergency operating lever 40 to press the rotation inducing flange 332 of the master locking link 33, so that the master locking link 33 rotates in a clockwise direction from the door lock release preparation state where the master locking link 33 is hung on the seating protrusions 231 of the pawl release lever 23 to rotate the pawl release lever 23 in an anticlockwise.

The pawl 12 is rotated by the rotation of the pawl release lever 23 together and thus separated from the catch 11, so that the catch 11 can be freely rotated. Thus, the door locked to the vehicle body is released from it and can be opened.

Figure 10:
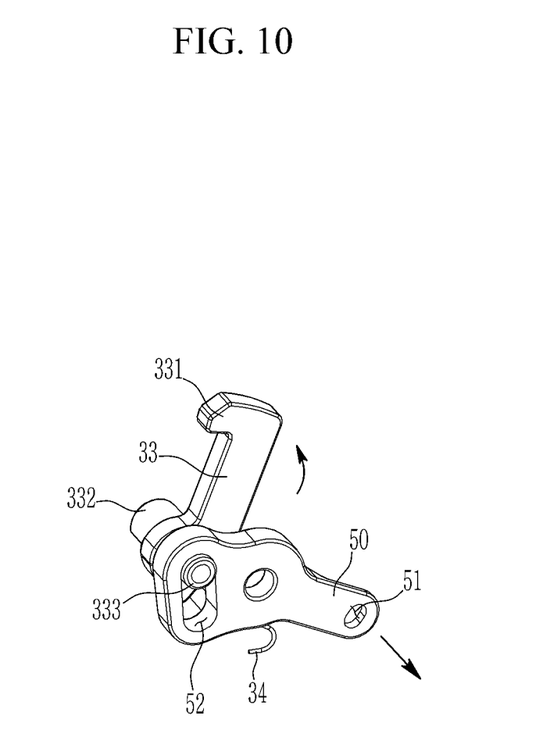
FIG. 10 is an operational explanatory diagram of an outside emergency operating lever and the master locking link of the motor-driven door latch for the vehicle according to an exemplary embodiment of the present invention.

On the other hand, in the door lock release preparation state, if the user pulls the outside handle, as shown in FIG. 10, an outside emergency operating lever 50 connected with the outside handle through a wire is rotated.

The outside emergency operating lever 50 may be installed on the second base plate 2 to be rotatable, one end portion thereof may be formed with a wire hole 51 with which a wire is connected and the other end portion thereof may be formed with a first long hole 52 into which a pin shaft 333 provided at the master locking link 33 is inserted.

When the outside emergency operating lever 50 is rotated, the master locking link 33 is further rotated in a clockwise direction from the door lock release preparation state by the rotation of the outside emergency operating lever 50 to rotate the pawl release lever 23 in an anticlockwise.

The pawl 12 is rotated by the rotation of the pawl release lever 23 together to be separated from the catch 11 to allow the catch 11 to freely rotate, so that the door locked to the vehicle body is released from it and the door can be opened.

Figure 11:
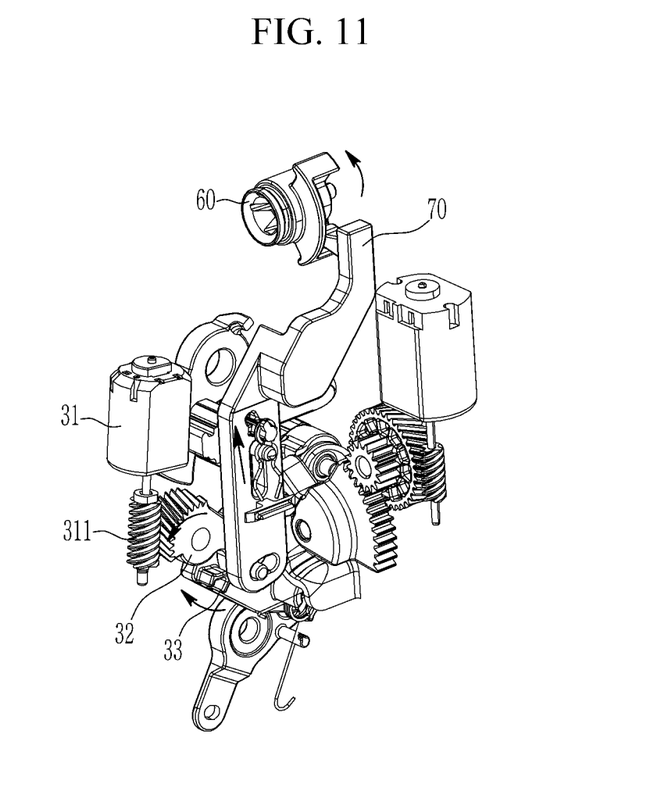
FIG. 11 is an operational explanatory diagram when operating a key for a vehicle of the motor-driven door latch for the vehicle according to an exemplary embodiment of the present invention.

On the other hand, when the battery of the vehicle is discharged and the main motor 21 and the auxiliary motor 31 become inoperable, if the user inserts a key for a vehicle a key hole to rotate a key cylinder, as shown in FIG. 11, a key nut 60 provided at the key cylinder is rotated and a key lever 70 is raised by the rotation of the key nut 60 to rotate the second driven gear 32. Thus, the rotation of the second driven gear 32 allows the master locking link 33 to be released from the second driven gear 32. The master locking link 33 is rotated by the elastic restoring force of the pressurizing spring 34 in a clockwise direction, so that the door lock release preparation state where the hook 331 of the master locking link 33 is hung on the seating protrusions 231 of the pawl release lever 23 is achieved.

In the door lock release preparation state, when the user pulls the outside handle, as described above, the outside emergency operating lever 50 is rotated so that the door can be opened.

Figure 12:
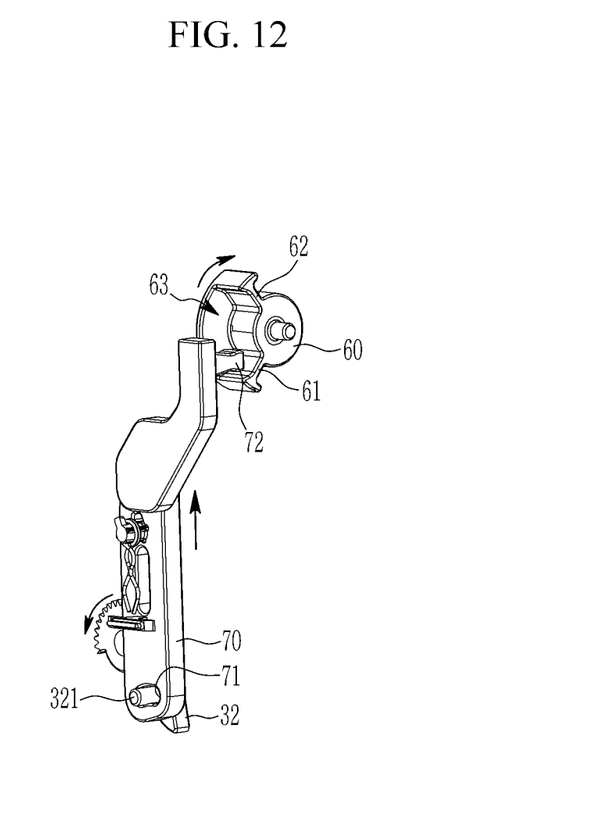
FIG. 12 is an operational explanatory diagram of a key nut and a key lever of the motor-driven door latch for the vehicle according to an exemplary embodiment of the present invention.

Referring to FIG. 12, a second long hole 71 may be formed at a lower portion of the key lever, a coupling protrusion 321 inserted into the second long hole 71 may be provided at the second driven gear 32, a protrusion 72 may be provided on an upper portion of the key lever 70, two operating protrusions 61 and 62 spaced from each other in a circumference direction may be provided at the key nut 60 and a movable groove 63 which the protrusion 72 is inserted into and can move therein may be provided between the first and second operating protrusions 61 and 62.

That is, when the auxiliary motor 31 is operated and the second driven gear 32 is rotated, the key lever 70 moves up and down by the rotation of the second driven gear 32 but the protrusion 72 of the key lever 70 moves up and down in the movable groove 63 of the key nut 60, so that the protrusion 72 of the key lever 70 is not contacted with the first and second operating protrusions 61 and 62 of the key nut 60.

On the other hand, when the key nut 60 is rotated by operation of the key for a vehicle, the key lever 70 is contacted with the first operating protrusion 61 to be forcibly raised up, so that the second driven gear 32 is forcibly rotated by the key lever 70 and the master locking link 33 rotates also, thereby achieving the door lock release preparation state.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A motor-driven door latch for a vehicle having a vehicle body and a vehicle door, the motor-driven door latch comprising:
    a catch part configured to be caught on a striker for locking the vehicle door to the vehicle body or configured to be released from the striker for opening the vehicle door from the vehicle body, the striker being mounted on the vehicle;
    a door locking and releasing part including a main motor and configured to apply a torque to the catch part through the main motor to allow the catch part to be locked to or released from the striker;
    an emergency door releasing part comprising an auxiliary motor and contacted with the door locking and releasing part by operation of the auxiliary motor when the main motor is not operated;
    an inside emergency operating lever connected with an inside handle installed at the vehicle door and configured to receive an operation force of the inside handle to rotate and apply torque to the catch part through the emergency door releasing part and the door locking and releasing part; and
    an outside emergency operating lever connected with an outside handle installed at the vehicle door and configured to receive an operation force of the outside handle to rotate and to apply torque to the catch part through the emergency door releasing part and the door locking and releasing part,
    wherein the auxiliary motor includes a second drive gear, and
    wherein the emergency door releasing part comprises:
        a second driven gear engaged with the second drive gear,
        a rotatable master locking link contacted with the second driven gear so that a rotation of the second driven gear is limited, the master locking link including a hook at one end portion thereof, and
        a pressurizing spring configured to apply an elastic force to the master locking link in order to rotate the master locking link in a direction.

2. The motor-driven door latch of claim 1, wherein the catch part comprises:
    a catch having a locking groove which the striker mounted on the vehicle body is configured to be caught in or separated from, the catch configured to be rotatable; and
    a pawl configured to be rotatable so that the pawl is in close contact with the catch to limit the rotation of the catch or is separated from the catch to allow the catch to be freely rotatable.

3. The motor-driven door latch of claim 2, wherein the door locking and releasing part comprises:
    the main motor rotatable in a clockwise direction and an anticlockwise direction, the main motor including a first drive gear;
    a first driven gear engaged with the first drive gear;
    a pawl release lever coupled to the pawl to be integrally rotated; and
    an operating lever with the first driven gear and configured to receive the torque through the first driven gear to rotate the pawl release lever.

4. The motor-driven door latch of claim 1, wherein:
    the inside emergency operating lever is configured to be rotatable and one end portion thereof comprises a pressurizing flange; and
    the master locking link comprises a rotation inducing flange, which corresponds to the pressurizing flange and is configured to be pressed by the pressurizing flange down to rotate the master locking link.

5. The motor-driven door latch of claim 1, wherein:
    the outside emergency operating lever is configured to be rotatable, wherein one end portion of the outside emergency operating lever is formed with a wire hole to which a wire is connected and another end portion of the outside emergency operating lever is formed with a first long hole; and
    the master locking link comprises a pin shaft inserted into the first long hole.

6. The motor-driven door latch of claim 1, further comprising a key cylinder into which a key for the vehicle is insertable to operate the vehicle.

7. The motor-driven door latch of claim 6, wherein:
    the key cylinder comprises a key nut;
    the key nut is connected with one end portion of a key lever; and
    another end portion of the key lever is connected with the second driven gear.

8. The motor-driven door latch of claim 7, wherein:
    the key lever is formed with a second long hole at a lower portion thereof; and
    the second driven gear comprises a coupling protrusion inserted into the second long hole.

9. The motor-driven door latch of claim 8, wherein:
    a protrusion is provided at an upper portion of the key lever;
    the key nut comprises two first and second operating protrusions spaced from each other in a circumference direction; and
    a movable groove into which the protrusion is inserted to move is provided between the first and second operating protrusions.

10. The motor-driven door latch of claim 3, further comprising:
    two seating protrusions formed at the pawl release lever; and
    a pressurizing protrusion provided at the operating lever, wherein the pressurizing protrusion is seated on the seating protrusions and is configured to press and rotate the pawl release lever.

11. The motor-driven door latch of claim 1, further comprising a door latch controller configured to detect an operation of a handle or a button installed at the vehicle door and to apply an operation signal to the main motor.

12. The motor-driven door latch of claim 11, wherein the door latch controller is configured to detect a vehicle collision through a collision detecting sensor to apply the operation signal to the auxiliary motor when the main motor is inoperable due to vehicle collision.

13. A vehicle comprising:
- a vehicle body;
- a vehicle door;
- a striker mounted on the vehicle;
- a catch part configured to be caught on the striker for locking the vehicle door to the vehicle body or configured to be released from the striker for opening the vehicle door from the vehicle body;
- a door locking and releasing part including a main motor and configured to apply a torque to the catch part through the main motor to allow the catch part to be locked to or released from the striker;
- an emergency door releasing comprising an auxiliary motor and contacted with the door locking and releasing part by operation of the auxiliary motor when the main motor is not operated;
- an inside emergency operating lever connected with an inside handle installed at the vehicle door and configured to receive an operation force of the inside handle to rotate and apply torque to the catch part through the emergency door releasing part and the door locking and releasing part; and
- an outside emergency operating lever connected with an outside handle installed at the vehicle door and configured to receive an operation force of the outside handle to rotate and to apply torque to the catch part through the emergency door releasing part and the door locking and releasing part,
- wherein the auxiliary motor includes a second drive gear, and
- wherein the emergency door releasing part comprises:
  - a second driven gear engaged with the second drive gear,
  - a rotatable master locking link contacted with the second driven gear so that a rotation of the second driven gear is limited, the master locking link including a hook at one end portion thereof, and
  - a pressurizing spring configured to apply an elastic force to the master locking link in order to rotate the master locking link in a direction.

14. The vehicle of claim 13, wherein the catch part comprises:
- a catch having a locking groove which the striker mounted on the vehicle body is configured to be caught in or separated from, the catch being configured to be rotatable; and
- a pawl configured to be rotatable so that the pawl is in close contact with the catch to limit the rotation of the catch or is separated from the catch to allow the catch to be freely rotatable.

15. The vehicle of claim 14, wherein the door locking and releasing part comprises:
- the main motor configured to rotate in a clockwise direction and an anticlockwise direction, the main motor including a first drive gear;
- a first driven gear engaged with the first drive gear;
- a pawl release lever coupled to the pawl to be integrally rotated; and
- an operating lever engaged with the first driven gear and configured to receive the torque through the first driven gear to rotate the pawl release lever.

16. The vehicle of claim 13, wherein:
- the inside emergency operating lever is configured to be rotatable and one end portion thereof comprises a pressurizing flange;
- the outside emergency operating lever is installed to be rotatable, wherein one end portion of the outside emergency operating lever is formed with a wire hole to which a wire is connected and another end portion of the outside emergency operating lever is formed with a first long hole; and
- the master locking link comprises a rotation inducing flange, which corresponds to the pressurizing flange and is configured to be pressed by the pressurizing flange down to rotate the master locking link, the master locking link comprising a pin shaft inserted into the first long hole.

17. The vehicle of claim 13, further comprising a key cylinder into which a key for the vehicle insertable to operate the vehicle, wherein:
- the key cylinder comprises a key nut;
- the key nut is connected with one end portion of a key lever; and
- another end portion of the key lever is connected with the second driven gear.

18. The vehicle of claim 13, further comprising a door latch controller configured to detect an operation of a handle or a button installed at the vehicle door and to apply an operation signal to the main motor.

* * * * *

UNITED STATES PATENT AND TRADEMARK OFFICE
CERTIFICATE OF CORRECTION

PATENT NO. : 11,525,290 B2
APPLICATION NO. : 16/441928
DATED : December 13, 2022
INVENTOR(S) : Jinwoo Nam et al.

It is certified that error appears in the above-identified patent and that said Letters Patent is hereby corrected as shown below:

In the Claims

Claim 3, Column 8, Line 9; insert --engaged-- between "lever" and "with".

Claim 9, Column 8, Line 51; delete "is provided".

Signed and Sealed this
Seventeenth Day of January, 2023

Katherine Kelly Vidal
*Director of the United States Patent and Trademark Office*